United States Patent [19] [11] Patent Number: 4,543,626
Bean et al. [45] Date of Patent: Sep. 24, 1985

[54] APPARATUS AND METHOD FOR CONTROLLING DIGITAL DATA PROCESSING SYSTEM EMPLOYING MULTIPLE PROCESSORS

[75] Inventors: Robert Bean; Edward A. Gardner; Michael Chow; Barry L. Rubinson; Richard F. Lary; Robert Blackledge, all of Colorado Springs, Colo.

[73] Assignee: Digital Equipment Corporation, Maynard, Mass.

[21] Appl. No.: 447,228

[22] Filed: Dec. 6, 1982

[51] Int. Cl.$^4$ .............................................. G06F 13/00
[52] U.S. Cl. .................................................... 364/200
[58] Field of Search ... 364/200 MS File, 900 MS File

[56] References Cited

U.S. PATENT DOCUMENTS

| 3,348,210 | 10/1967 | Ochsner | 364/200 |
| 3,496,551 | 2/1970 | Driscoll et al. | 364/200 |
| 3,643,227 | 2/1972 | Smith | 364/200 |
| 3,962,685 | 6/1976 | Isle | 364/200 |
| 4,394,727 | 7/1983 | Hoffman et al. | 364/200 |
| 4,394,730 | 7/1983 | Suzuki et al. | 364/200 |

OTHER PUBLICATIONS

C. Weitzman, "Distributed Micro/Minicomputer Systems" 1980, Prentice Hall, pp. 30-32, 371-386.

Primary Examiner—James D. Thomas
Assistant Examiner—David Y. Eng
Attorney, Agent, or Firm—Cesari and McKenna

[57] ABSTRACT

A control arrangement for coordinating operations of multiple processors in a multiprocessor system in response to a command. Each command is associated with a route comprising a sequence of route vectors, each identifying an operation to be performed to execute the command, as well as the process, or station, to execute the route vector. In response to the receipt of a command, a control block is generated identifying the first route vector in the route associated with the command. Each station has a work queue containing control blocks, which the station retrieves and processes sequentially. The control block is first sent to the work queue of the station to perform the first operation. When the station gets to the control block, it performs the operation required by the route vector, modifies the control block to identify the next route vector in the sequence, and transfers the control block to the work queue of the station to perform the operation required by the next route vector in the route.

49 Claims, 12 Drawing Figures

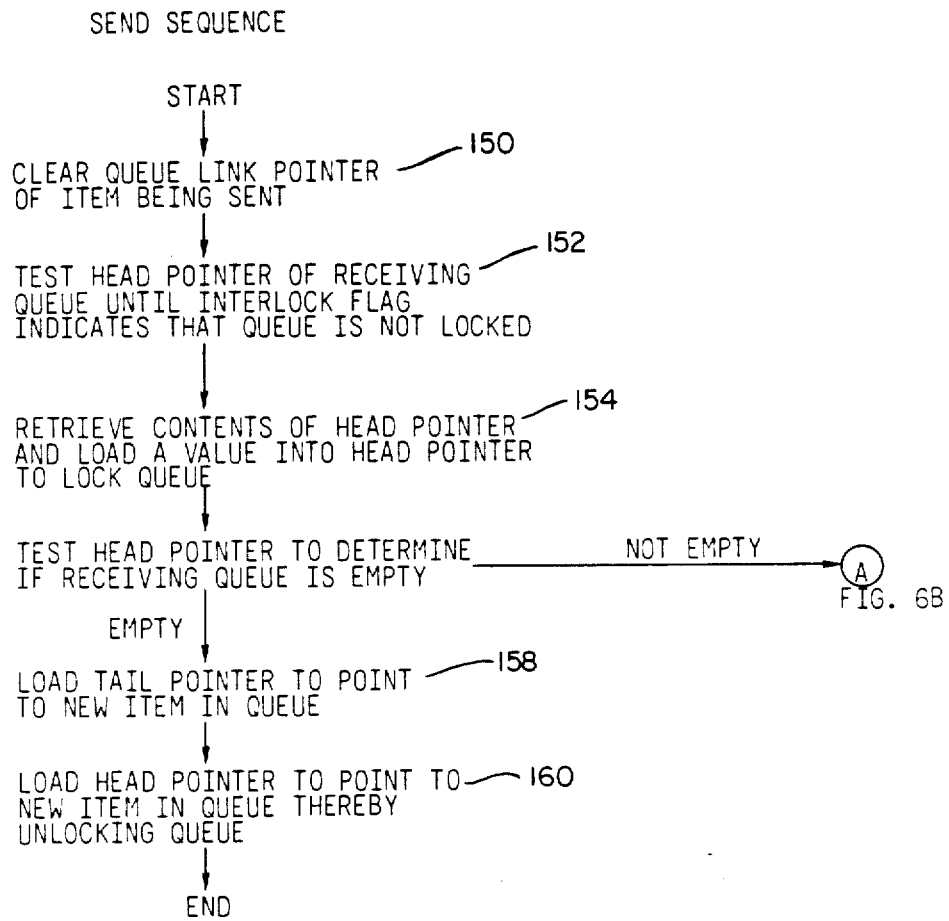

SEND SEQUENCE

"SEND TO HEAD" SEQUENCE

APPARATUS AND METHOD FOR CONTROLLING DIGITAL DATA PROCESSING SYSTEM EMPLOYING MULTIPLE PROCESSORS

BACKGROUND OF THE INVENTION

1. Field of the Invention

The invention relates generally to the field of arrangements in which data processing systems employing multiple special-purpose processors control or schedule the processing of tasks or processes, and more particularly to arrangements by which instructions for processing tasks or processes are transferred among the processors forming such a multi-processing system.

2. Description of the Prior Art

The reduction in cost and size of processors used in electronic data processing systems over the last few years has given rise to a dramatic increase in the number of processors, particularly microprocessors, that are used in data processing systems. Processors are used in data processing systems both as part of processor units for processing user programs and as part of control units that control many of the peripheral storage elements such as disk and tape drives and input/output elements such as printers, keyboards and visual display devices, scientific instruments, card readers and punches, communications lines and the like.

In many instances, it is desirable to use separate processor units in a system to execute various classes of instructions. For example, many systems have separate processor units constructed to execute floating point instructions or fixed point instructions or to perform matrix operations or operate on or search strings of characters. Special processor units are designed to speed execution of these instructions. Furthermore, in some instances the separate processor units may be able to execute instructions simultaneously, thereby speeding operation of the system.

The use of processors in peripheral and input/output control units allows a processor unit to use high-level commands to the control units that only generally defines the operations to be performed, and the control unit itself then determines the detailed operations that must be performed to carry out the operations required by the commands. Furthermore, processors in the control unit can initiate and perform diagnostics or maintenance on the attached peripheral units without intervention of the processing unit or units, thereby freeing them to concentrate on executing user programs. This arrangement substantially lessens the amount of direct attention that a processor unit must give to the detailed operations of the peripheral and input/output elements.

Systems employing multiple processors generally have one of two types of arrangements for controlling and scheduling the performance of tasks by the various processors, both of which are described in S. Madnick, et al., *Operating Systems*, (McGraw-Hill Book Company, New York, New York: 1974) at pages 244-247. In one arrangement, a master processor generates tasks required by a user program, for example, and distributes them to the slave processors. The master processor generally monitors the status of the slave processors. To initiate an operation by the slave processor, the master interrupts the slave, and when the slave processor finishes the task, it interrupts the master processor to indicate status. The master processor may then assign the slave a new task. The master processor may also perform diagnostic and maintenance programs on the system.

The use of a master processor simplifies scheduling, but if the demands on the master processor are heavy, it may become overloaded, thereby slowing down the system. Furthermore, the requirement that the master and slave processors communicate by interrupts further adds to the overhead, as time is required for both processors to service the interrupts.

The second arrangement eliminates the necessity of dedicating a processor solely to generating tasks and scheduling. In this arrangement, a state list of processes and their status are stored so as to allow any processor to have access to the list. Whenever a processor must stop execution of a process, it updates the process's status in the state list and then finds another process to run. In such a system employing decentralized control, it is necessary to establish good coordination and communication among all of the processors to ensure that a process is being processed by only one processor at a time, and also to ensure that all processes are processed. As the number of processors in the system increases, satisfactory communication and coordination becomes more difficult to achieve.

SUMMARY

It is therefore an object of the invention to provide a new and improved arrangement for communicating and coordinating among processors forming a multiprocessor system.

It is a further object of the invention to provide a new control arrangement in a multiprocessor system employing functionally-dedicated processors which simultaneously reduces the amount of direct communication among processors forming the system and enhances coordination among the processors.

It is a further object of the invention to provide a new and improved multiprocessor control unit for controlling peripheral and input/output units in a data processing system.

In brief summary, a system employs multiple special-purpose processors to execute a plurality of commands. Each command is processed by performing a predefined sequence of operations. Each operation is performed by a processor, or more specifically by a process, or "station", that is executed by one of the processors in the system.

A memory unit in the system stores a "route" which contains a list of "route vectors" each specifying an operation to be performed to execute the command and the station which is to perform the operation. When a command is received, one processor, as a source processor, generates a control block from the host command. The control block includes a pointer identifying the first route vector in the route and transfers the control block to a work queue of the station which is to perform the first operation.

Each station sequentially retrieves control blocks from its work queue. After retrieving a control block, the station retrieves the route vector identified in the control block and performs the operation specified by the route vector. After performing the operation, the station advances the pointer in the control block to identify the next route vector in the route and transfers the control block directly to the work queue of the station identified in the next route vector as performing the next operation.

As an additional feature, each route vector may also include an identification of a station to receive a control block if the executing station is unsuccessful in its attempt to perform the operation required by the route vector.

Further, each processor in the multiprocessor system may process a plurality of stations, with each station having a separate work queue. In such a case, each processor also can have a service queue. When a station transfers a control block to an empty work queue, the identification of the work queue is also transferred to the receiving processor's service queue. A processor can determine from its service queue that one of its stations' previously-empty work queues now has a control block. The processor thus need not poll its station's work queues to determine whether they contain control blocks to be processed, and a transferring station need not interrupt a processor of a receiving station when it is transferring a control block to an empty work queue.

Additionally, the source processor may generate multiple independently-executable control blocks from certain host commands. If multiple control blocks are generated, the source processor may also establish a counter identifying the number of control blocks that it generated based on the command. When a station executes the last route vector in the route for a control block, it decrements the counter. When the counter is decremented to zero, a response is generated indicating that the command has been executed.

BRIEF DESCRIPTION OF THE DRAWINGS

This invention is pointed out with particularity in the appended claims. The above and further objects and advantages of this invention may be better understood by referring to the following description taken in conjunction with the accompanying drawings, in which:

FIGS. 4, 5A, 5B, 6A and 6B are flow diagrams useful in understanding features of the invention.

DESCRIPTION OF AN ILLUSTRATIVE EMBODIMENT

Figure 1:
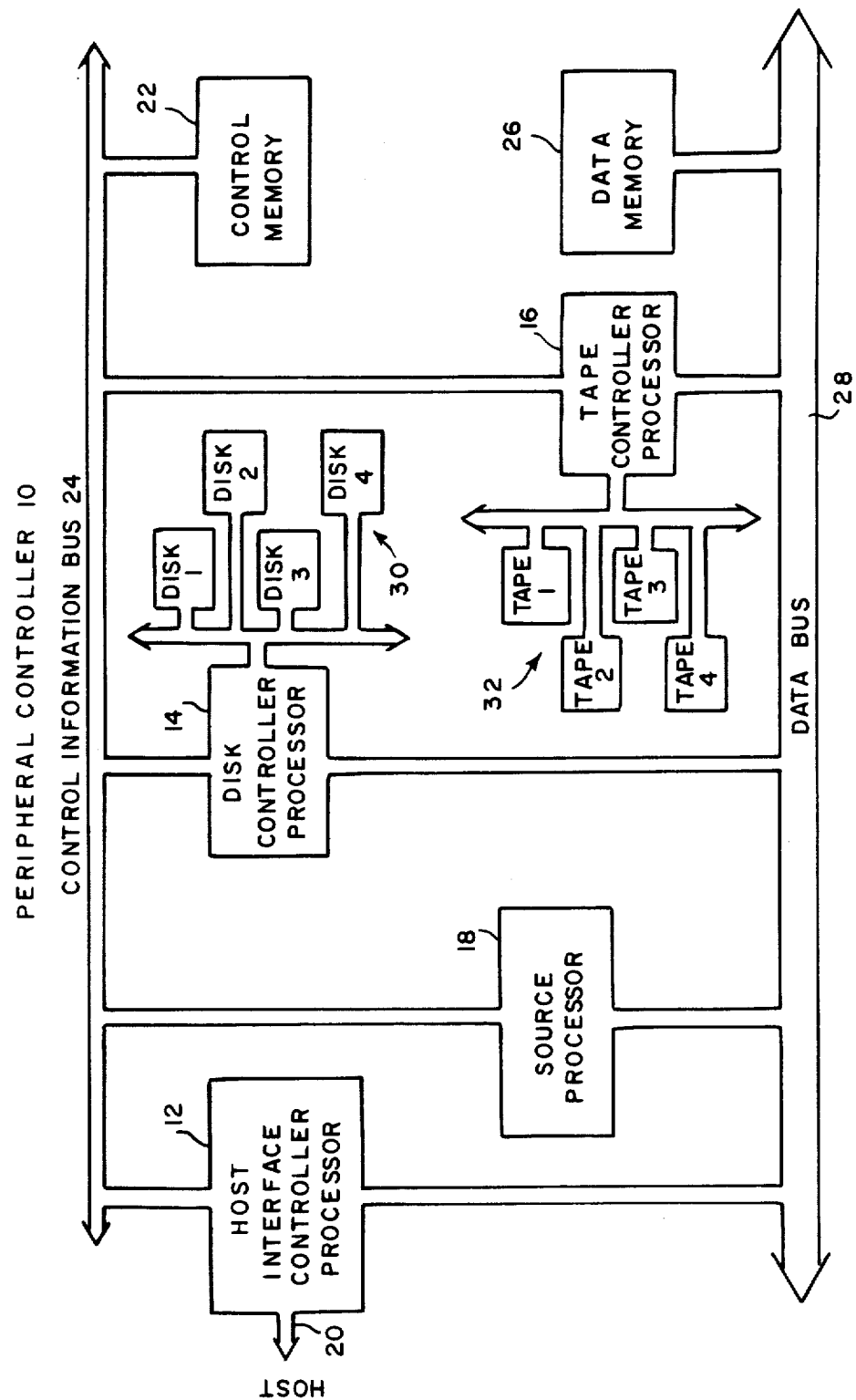
FIG. 1 is a a peripheral controller employing multiple processors constructed in accordance with the invention.

FIG. 1 depicts a peripheral controller 10 having a multiprocessing arrangement including four special-purpose processors, including a host interface controller processor 12, a disk controller processor 14, a tape controller processor 16, and a source processor 18. The host interface controller processor 12 communicates with a host data processing system (not shown) over a host bus 20 and transfers commands and status information between the host bus 20 and a control memory 22 over a control information bus 24. The host interface controller processor 12 also transfers data between the host bus 20 and a data memory 26 over a data bus 28.

The disk controller processor 14 and tape controller processor 16 are also connected to control information bus 24 and data bus 28. Disk controller processor 14 is also connected to a plurality of disk drives, four of which are shown in FIG. 1, generally indicated by the reference numeral 30, and tape controller processor 16 is also connected to tape drives, four of which are shown in FIG. 1, generally indicated by the reference numeral 32.

Control memory 22 also stores control information that is used by disk controller processor 14 and tape controller processor 16 to transfer data stored in data memory 26 between disk drives 30 any/or tape drives 32 over data bus 28. The control memory also stores control information that is used by host interface controller processor 12 in performing its operations.

The source processor 18 is also connected to control information bus 24 and data bus 28 and may retrieve control information from and store control information in control memory 22. Source processor 18 generates the control information that is used by the disk controller processor and tape controller processor, and may also execute diagnostic and maintenance programs.

The peripheral controller 10 depicted in FIG. 1 is shown as being connected only to disk drives 30 and tape drives 32. This is by way of example only; the peripheral controller can also be connected to other types of peripheral devices as well as to input/output devices such as printers, video display terminals and keyboards, scientific devices and instruments, and to communications lines, with suitable controller processors. Furthermore, the controller 10 may be connected to several host processors through additional host interface controller processors 12.

The source processor 18 is also connected to control information bus 24 and data bus 28. A separate source processor is not required to achieve the benefits of the invention; one or more of the controller processors 12, 14 and 16 may perform the functions of the source processor. In the embodiment depicted in FIG. 1, the source processor 18 retrieves the host commands that are loaded into control memory 22 and generates the control information that the processors 12, 14 and 16 use to execute the host commands. Additionally, the source processor 18 processes maintenance or diagnostic programs to insure that the controller 10 is properly operating and to detect the causes of errors that it or that one of the other processors may detect. Furthermore, when required to execute a host command, either source processor 18 or the controller processors 14 and 16 may perform certain operations such as generating the usual sector or block identification information that may be written as a header on disks or tapes during WRITE operations or other transfers in which data is transferred to the peripheral or input/output unit. These operations are performed by tasks or processes forming a part of the respective processor's control programs. Each task or process that is performed by the processors 12, 14, 16 and 18, in response to a host command, including diagnostic and maintenance tasks that may be initiated by the source processor 18, is a "station".

Figure 2:
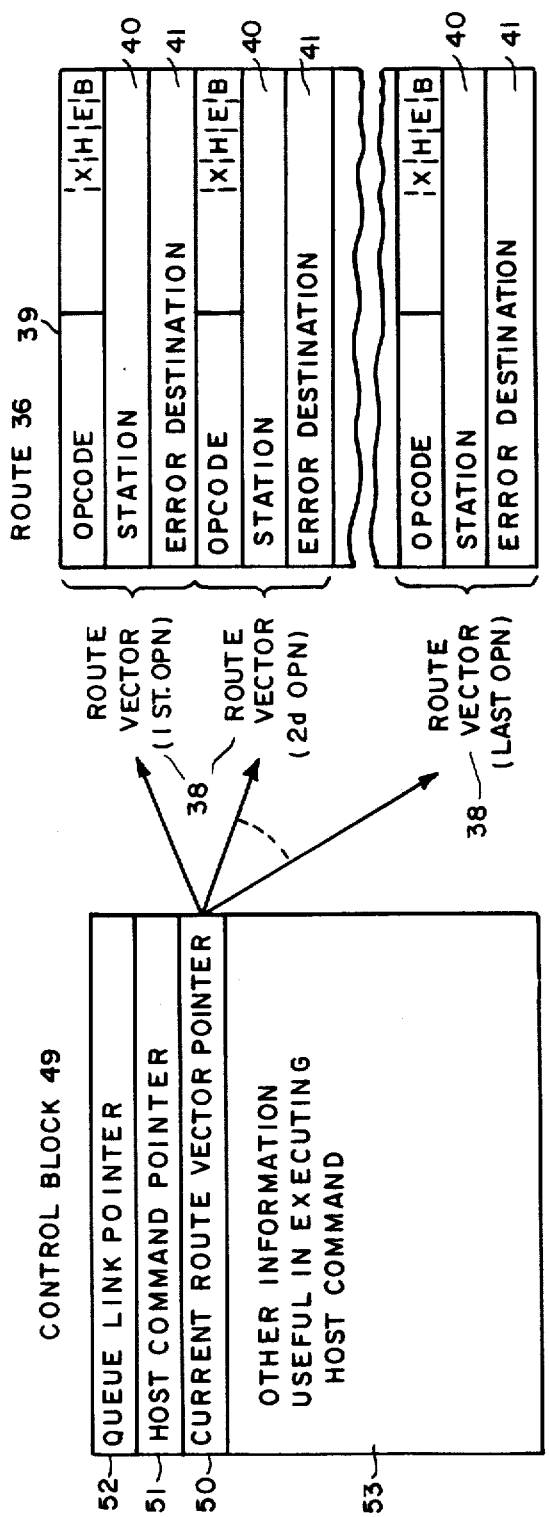
FIGS. 2 and 3 are diagrams depicting certain control structures that are useful in understanding the invention.

In accordance with the invention, each host command that can be executed by peripheral controller 10 is associated with a route 36, an example of which is depicted to the right in FIG. 2. In the embodiment depicted in FIG. 1, the routes are stored in control memory 22 and thus may be used by any of the stations forming the peripheral controller. Each route vector 38 in the list identifies, in an OPCODE field 39, an operation to be performed during processing of the host command. Each route vector 38 also identifies the station to execute the route vector, that is, to perform the operation identified in the OPCODE field 39 of the route vector, in the list in a STATION field 40. Furthermore, in one specific embodiment, each route vector 38 also contains fields which identify the station to be notified if a station is unsuccessful in its attempt to perform the operation required by the route vector 38, in an ERROR DESTINATION field 41, and four flags, an X flag 42, an H flag 43, an E flag 44, and a B flag 45, which have meanings as described below.

For each host command that is received by peripheral controller 10, the source processor 18 generates a control block 49, an example of which is depicted to the left FIG. 2. Control block 49 includes a current route vector pointer 50 that points to a route vector 38 in the route associated with that host command. More specifically, the current route vector pointer 50 contains the address of the OPCODE field of the first route vector of the route associated with the host command. When generated by source processor 18, the current route vector pointer 50 of control block 49 points to the first route vector, identified as ROUTE VECTOR (1ST OPN), in the route 36.

Figure 3:
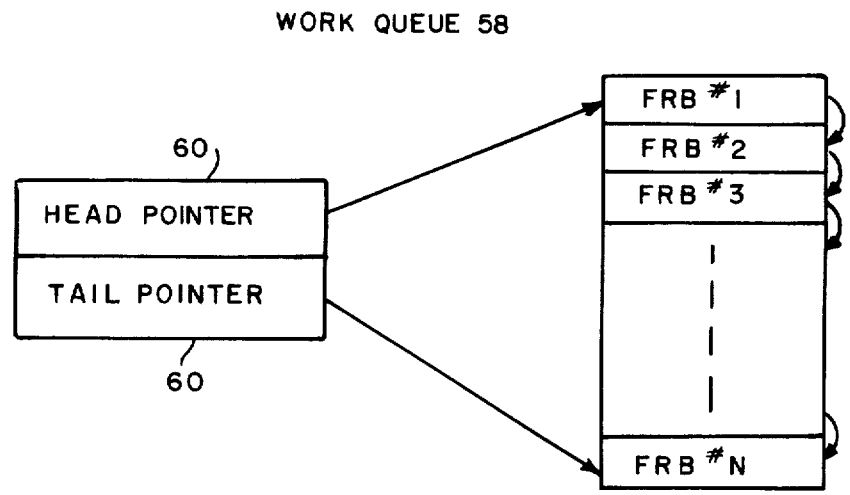

The control block 49 also includes a queue link pointer 52, which is the first field of the control block. Each station has an associated work queue 58 depicted in FIG. 3. The work queue 58 stores control blocks that are processed by the station in the order in which they are stored in the queue. In one specific embodiment, the work queue is located in control memory 22 and is defined by (a) a head pointer 60 which points to, or contains the address of the location in control memory 22 containing, the first control block in the station's work queue 58, and (b) a tail pointer 61 that points to, or contains the address of the location in control memory 22 containing, the last control block in the work queue 58. As depicted in FIG. 3, the queue link pointer 52 of each control block in the work queue points to the next control block in the queue, thereby identifying the control blocks forming the queue.

The control block also includes a host command pointer 51, which contains the address of the host command that caused the source processor 18 to generate the control block. As explained below, in one embodiment, a host command may cause the source processor 18 to generate multiple control blocks. If this occurs, the source processor may also establish a counter identifying the number of control blocks that are generated for the host command. When the last route vector is processed for each control block, the station that executes the last route vector may decrement the counter using the host command pointer to identify the host command and counter.

The control block 49 may also contain other information, in fields generally indicated at 53, which is useful in executing the host command. This information may include peripheral or input/output unit address information, information identifying buffers in data memory 26 containing data to be written or into which data is to be transferred, and the like.

In operation, when the source processor 18 generates the control block 49 depicted in FIG. 2, it transfers the control block to the work queue 59 (FIG. 3) of the station identified in the first route vector 38 as the station that is to process the first route vector 38.

Each station sequentially retrieves the control blocks from its work queue 59, and performs the operation called for in the OPCODE field 39 of the route vector 38 to which the current route vector pointer 50 points. If the station is able to perform the operation, it advances the current route vector pointer 50 in the control block to point to the next route vector in route 36. That is, the station loads the address of the next route vector's OPCODE field into the current route vector pointer 50, and performs a SEND operation to transfer the control block to the work queue of the station identified in the STATION field 40 of the route vector 38 now identified by the current route vector pointer 50.

If the station is unable to process the route vector, that is, if it is unable to perform the operation required by the OPCODE field 39, it does not advance the current route vector pointer 50, but instead it uses the SEND operation to transfer the control block to the work queue identified by the ERROR DESTINATION field 41 of the route vector 38, which may be the work queue of a station that executes diagnostic or maintenance programs.

It can be seen that the invention provides a multiprocessor system having a number of advantages. Since the invention does not require a master processor, delays will not occur due to overloading of any one processor. Indeed, any or all of the processors may operate as source processors to generate control blocks for the system. Further, the stations can transfer the control blocks among the work queues without having to interrupt the receiving station or its associated processor, which also avoids delay. Additionally, the use of routes to define the operations to be performed by the stations in execution of the host command allows for a substantial amount of flexibility, such as branching and loops, since the operation and the identity of the station to perform each operation is stored in the route vector itself. This can be useful if the operations to be performed in response to a host command depend on certain conditions. For example, if a disk drive 30 (FIG. 1) has a cache, the operations performed, and hence the route vectors that are processed may depend on whether or not the data to be written onto the disk has already been stored in the cache.

Figure 4:
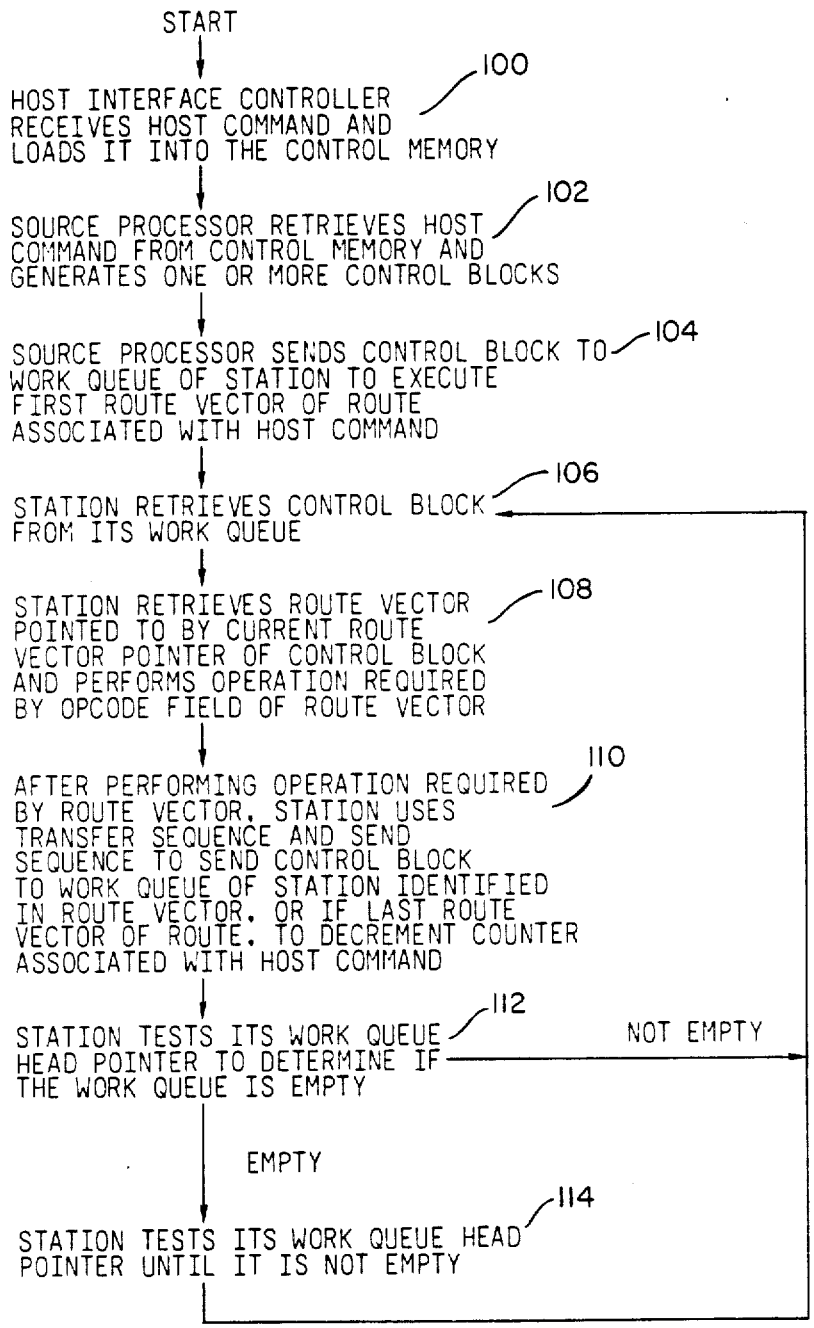

The invention may be more fully understood by referring to the flow diagram depicted in FIG. 4. The host interface controller processor 12 first receives a host command and loads it into the control memory (step 100). In step 102, the source processor 18 retrieves the host command from the control memory 22 and generates one or more control blocks 49 (FIG. 2). If more than one control block is generated for the host command, the control processor may establish a counter indicating the number of control blocks that were generated.

After it has generated a control block 49, the source processor 18 transfers it to the work queue (FIG. 3) of the station identified in the STATION field 40 of the first route vector of the route associated with the host command (step 104). The process by which one specific embodiment of the invention transfers control blocks will be explained below with respect to FIGS. 5, 6 and 7.

Each station retrieves control blocks from its work queue (step 106). With reference to FIG. 3, in one specific embodiment the station retrieves the control block from the location in control memory 22 identified by the contents of head pointer 60. The station then retrieves the route vector from the location in control memory 22 identified in the current route vector pointer 50 of the control block and performs the operation defined in the OPCODE field (step 108). After performing the operation, the station advances the current route vector pointer 50 (step 110, see also step 126 of FIG. 5). In one specific embodiment, the route vectors are all of uniform length, and the stations need only increment the current route vector pointer 50 by a constant value representing the length of the route vector to point to the next route vector. However, the route vectors can be of different lengths, and, if they are, the sequences that each station uses to process the different route vectors would have to accommodate the different lengths.

After the station advances the current route vector pointer 50, it transfers the control block to another work queue (step 110). If the station successfully perform the operation called for by the route vector, it transfers the control block to the station, specifically the work queue 59 of the station, that is identified by the STATION field 40 of the next route vector in the route. However, if the station is unable to perform the operation, it transfers the control block to the queue identified in the ERROR DESTINATION field 41 of this route vector. If this is the last route vector of the route 36, the station may also decrement a counter associated with the host command.

The head pointer 60 of work queue 59 also indicates whether any control blocks are in the work queue. In one specific embodiment, if the contents of the head pointer are zero, the work queue contains no control blocks to be processed. After the station performs the transfer sequence to transfer the control block 49 to another work queue 59, the station tests its work queue head pointer 60 to determine if the work queue is empty (step 112). If the work queue is not empty, the station returns to step 106 and retrieves the next control block from its work queue. If, on the other hand, the head pointer 60 indicates that the work queue is empty, the station may continue to test its work queue head pointer until it is not empty (step 114), at which time it returns to step 106 to process the next control block.

In one embodiment of the invention, the routes and route vectors are in a read-only portion of the common control memory 22. Alternatively, the route vectors may be distributed among local memories for the stations and processors; if this is the case, each local memory need only store the route vectors required to be executed by the station, as well as the next route vector in the route (or at least the STATION field of the next route vector) to allow the station to transfer the control block to the next station. This arrangement may require more memory to be distributed among the stations in which to store all of the route vectors, but it may decrease contentions among the stations for the common memory.

Figure 5:
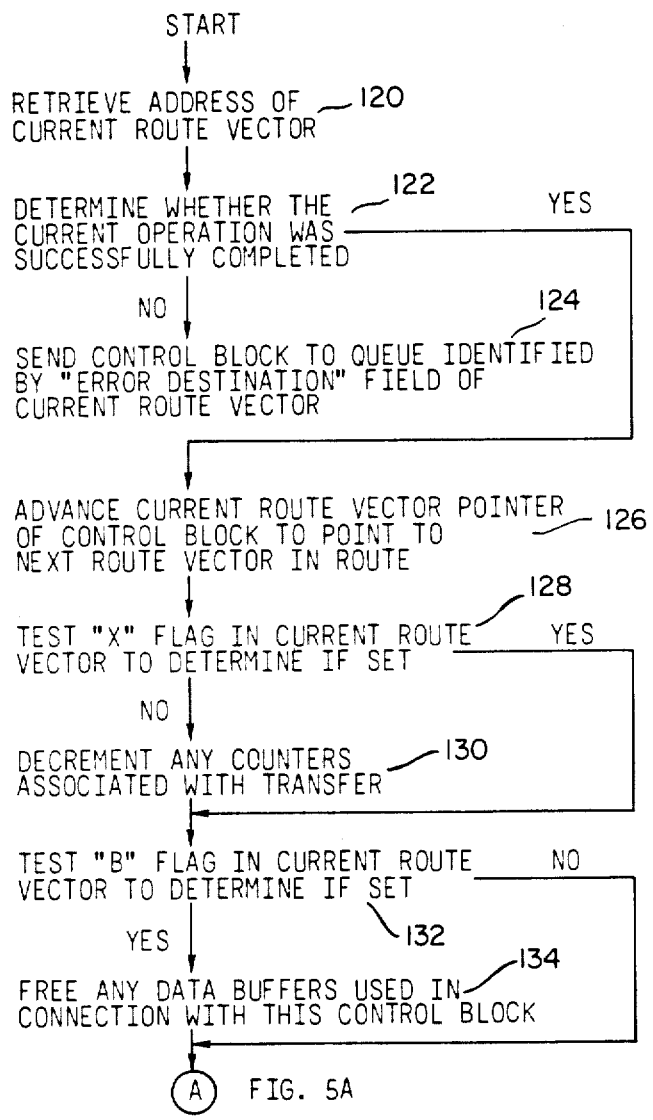

FIG. 5 depicts a sequence that is used by one specific embodiment of a station to transfer control blocks from its work queue to another station's work queue after it has completed executing the operation specified by the route vector's OPCODE field 39. The station first retrieves the address of the current route vector; that is, it retrieves the contents of the current route vector pointer 50 of the control block 49 (step 120). If the station was unable to perform the operation required by the route vector (step 121), it uses the SEND sequence depicted in FIG. 6 to transfer the control block to the work queue identified by the ERROR DESTINATION field 41 of the route vector (step 124). If the station did complete the operation specified by the route vector 38, it advances the current route vector pointer field 50 of the control block 49 to point to the next route vector 38 in the route 36.

The station then tests the X flag 42, H flag 43, E flag 44 and B flag 45 (FIG. 2) in the route vector 38. If the X flag is not set (step 128), the station decrements any counters that may have been associated with the transfer (step 130). In one specific embodiment, in which a station controls a disk drive, such counters can be used to determine if a SEEK operation is to take place.

If the B (for "buffer") flag is set, buffers in data memory 26 (FIG. 1) that were reserved for the host command freed so as for use in processing be available to other host commands(step 134).

If the E (for "end") flag of the route vector is set (step 136), this route vector is the last route vector in the route. A counter associated with the host command, the location of which is associated with the host command pointer 51 of the control block, is decremented (step 138).

Finally, if the H (for "head") flag of the route vector is set (step 140), the station transfers the control block to the beginning of the work queue of the station that is to process the next route vector (step 142). Alternatively, if the H flag is not set, the control block is transferred to the end of the work queue for the next station (step 144).

An example of a SEND sequence that is used by one embodiment of a station to transfer a control block to the work queue 59 of another station will be described with respect to FIGS. 6, 7A and 7B. In brief, the station transfers control blocks by modifying the head pointer 60, tail pointer 61, and queue link pointers 52 (FIG. 2). The station first clears the queue link pointer 52 of the control block being sent (step 150).

In one specific embodiment, the queues are interlocked; that is, if one station is reading from or transferring into the work queue, it loads a value into the head pointer that is recognized by all stations as an interlock value, which locks the queue to prevent any other station from reading from or transferring into the queue while the head pointer 60 contains that value. The station tests the contents of the head pointer 60 of the receiving work queue 59 until the contents of the head pointer indicates that the work queue is not locked (step 152). The work station then loads the interlock value into the head pointer to lock the queue (step 154).

The contents of the head pointer are examined to determine if the receiving work queue is empty (step 156). If it is empty, the tranferring station modifies both the tail pointer 61 and the head pointer 60, in that order, to point to the control block it is transferring. Both pointers are loaded with the address in control memory 22 of the control block being transferred (steps 158 and 160). The tail pointer is loaded first (step 158) and the head pointer second, as loading the address into the head pointer also serves to unlock the queue and make it available to other stations.

Figure 7A:
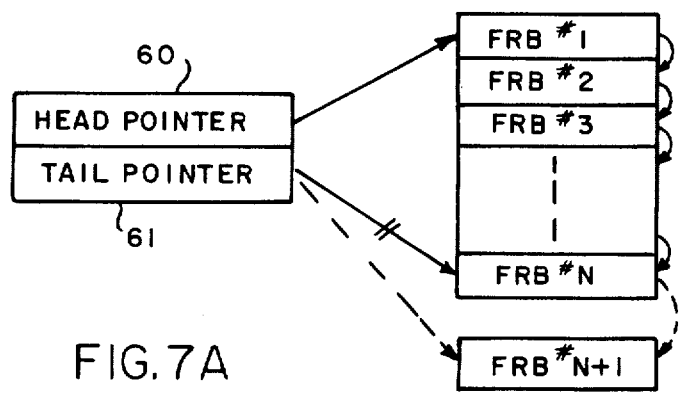
FIGS. 7A and 7B are diagrams useful in understanding the flow diagram of FIG. 6
Figure 7B:
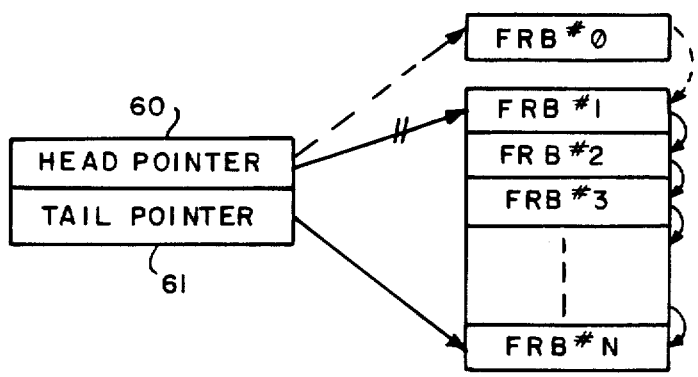

If in step 156 the receiving work queue is not empty, and if the H flag of the route vector was set (FIG. 5A, step 140), a "SEND TO HEAD" sequence is used to transfer the control block to the beginning of the receiving work queue (step 162 and FIG. 7B). The contents of the head pointer of the receiving work queue are loaded into the queue link pointer 52 of the control block being transferred (FRB #0, step 164). The queue link pointer of the control block being transferred thus points to the previous first control block in the work queue (FRB #1), as depicted by the broken arrow in FIG. 7B. The address of the new first control block (FRB #0) is then loaded into the head pointer 60 (step 166) thereby unlocking the queue.

Figure 5A:
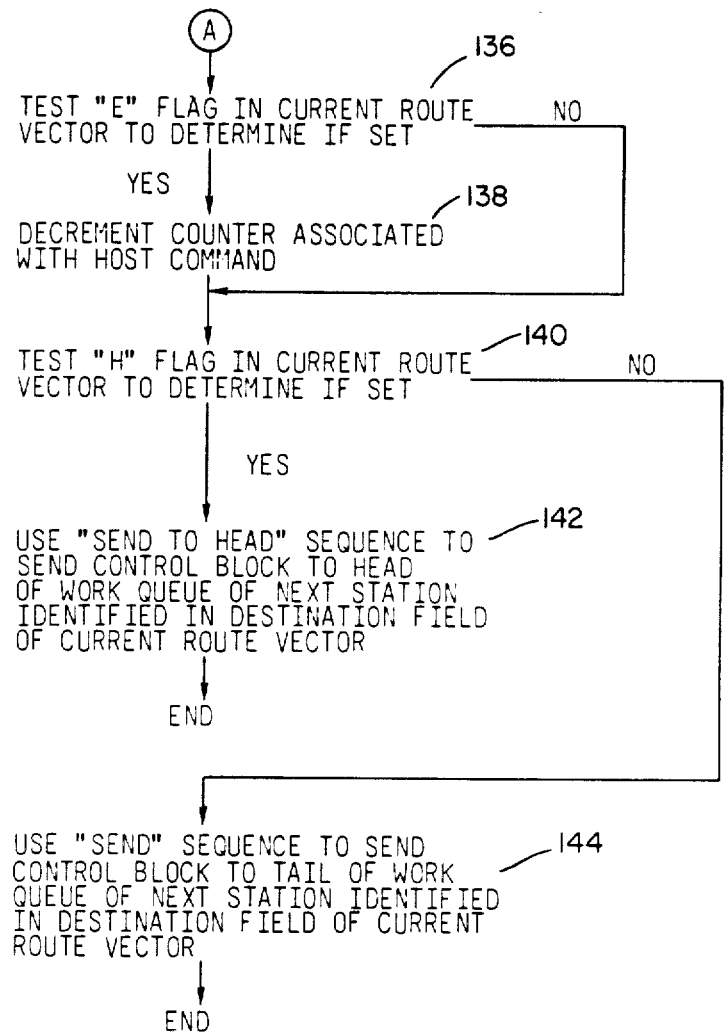

If in step 140 of FIG. 5A, the H flag of the route vector was not set, a "SEND" operation is performed which is depicted in FIG. 7A. The transferring station loads the address of the control block being transferred (FRB #N+1)into the queue link pointer 52 of the last control block (FRB #N) in the work queue (step 168). The address of the control block being transferred is then loaded into the tail pointer 61 (step 170), and the contents of the head pointer retrieved in step 154 are returned to the head pointer 60 to unlock the queue (step 172).

Figure 8:
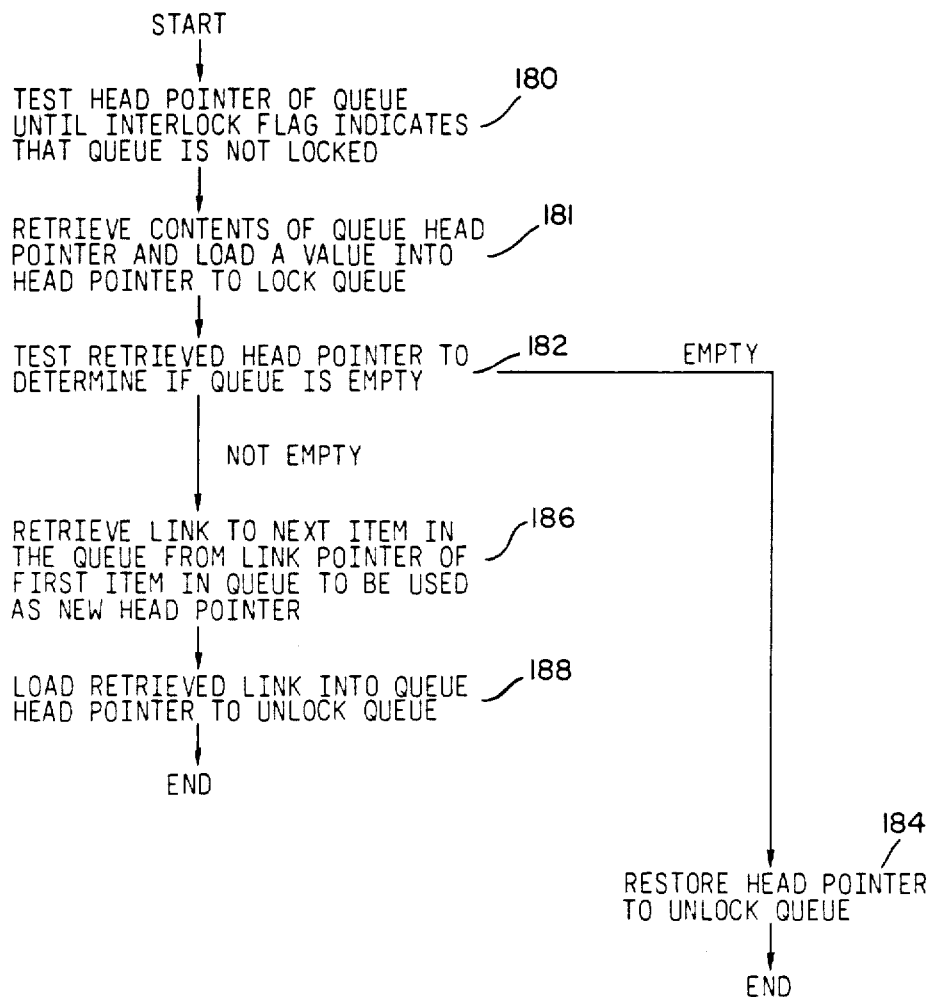
FIG. 8 is another flow diagram useful in understanding features of the invention.

FIG. 8 depicts a sequence used by a station of one specific embodiment of the invention to retrieve control blocks from its work queue. The contents of the queue head pointer 60 is the address of the first control block in the queue. The station first tests its work queue head pointer 60 until it indicates that the queue is not locked (step 180). The station then retrieves the contents of the head pointer 60 and loads the interlock value into it to lock the queue (step 181). The station tests the retrieved head pointer to determine if the queue is empty (step 182). If the queue is empty, the station restores the head pointer to unlock the queue (step 184). If the queue is not empty, the station uses the retrieved head pointer as an address to retrieve the queue link pointer from the first control block in the queue (step 186) and loads the queue link pointer into the queue head pointer to unlock the queue (step 188). The station can then retrieve the control block from the location identified by the retrieved contents of head pointer 60.

An example of the operations performed in response to a host command by a specific embodiment of the invention as embodied in peripheral controller 10 will serve to further illustrate the invention. In this example, the host command is a SHADOW WRITE operation to an address on disk drive 1 of disk drives 30 (FIG. 1). A SHADOW WRITE host command to an address in disk drive 1 causes the data to also be written into the same address in disk drives 2 and 3, and a back-up copy of the data to be written on tape in tape drive 4.

The SHADOW WRITE operation in this example has associated with it a route 36 containing route vectors 38 that cause the peripheral controller to perform the following operations:

(1) loading data from a host memory in the host data processing system into specified buffers in data memory 26;

(2) loading the data from the buffers in data memory 26 into disk drive 1;

(3) loading the data from the buffers in data memory 26 into disk drive 2;

(4) loading the data from the buffers in data memory 26 into disk drive 3;

(5) generating address information to be used as a header for the tape; and (6) loading the header and data from buffers in data memory 26 into tape drive 4.

On receiving this SHADOW WRITE command from the host, the source processor 18 first generates a control block 49 whose current route vector pointer 50 (FIG. 2) points to the first route vector 38 of the route 36 for processing the command. The source processor then transfers the generated control block it to the work queue 59 of the station identified in the STATION field 40 (FIG. 2) of this route vector, in this case the work queue 59 of host interface controller processor 12.

The host interface controller processor 12 processes control blocks in the order in which they are stored in its work queue. When it gets to the control block for this operation, it retrieves data from the host memory and loads it into the data buffer in the data memory 26 specified in the control block. If it successfully completes this operation, it advances the current route vector pointer 50 to point to the next route vector in the route, and transfers the control block to the work queue of the next station, in this case disk controller 14.

The disk controller processor 14 also processes the control blocks in the order in which they are stored in the work queue. When it gets to the control block for the SHADOW WRITE operation, it performs the operation required by the second route vector in the route, which causes it to load the data from the buffer specified in the control block in data memory 26 into the location specified in disk drive 1. After it performs this operation, it advances the current route vector pointer 50 to point to the next route vector and transfers the control block to the work queue of the station to process the next route vector, that is, to the station to perform the third operation for the SHADOW WRITE command.

In this case, the station to perform the third operation is also the disk controller processor 14. Therefore, disk controller processor 14 transfers the control block to the end of its work queue. When the disk controller processor again gets to this control block, it loads the same data from the same buffers in data memory 26 into the disk drive 2 at locations specified in the control block, advances the route vector pointer in the control block, and again transfers the control block to the end of its work queue to cause the data to be loaded into disk drive 3.

After the disk controller processor 14 has loaded the data into disk drive 3, it advances the current route vector pointer 50 to point to the next route vector, which causes the generation of the address information to be used as a header for the tape. In this case, the tape header is generated by a software process, so the disk controller processor 14 sends the control block to the work queue for that software process. After the software process generates the tape header, it advances the current route vector pointer 50 to point to the last route vector, and transfers the control block to the work queue of the tape controller processor 16.

The tape controller processor 16 also retrieves control blocks 49 from its work queue 59 in order. When it gets to this control block, it retrieves the route vector identified by the current route vector pointer 50, which causes it to load the header and the data from the data memory 26 into tape drive 4.

After the tape controller processor 16 performs the operation required by the route vector, it may advance the route vector pointer to a subsequent route vector and send the control block back to the work queue of host interface controller processor 12, which may then transmit a response to the host indicating successful completion of the SHADOW WRITE operation. Alternatively, the tape controller may indicate to the source processor 18 that the operation has been successfully completed, in which case control processor 18 may generate a response for transmission to the host through host interface controller processor 12.

If any of the stations are unable to perform the operation the operation required by a route vector, instead of transferring the control block to the work queue of the next station, it instead transfers the control block to a station that performs diagnostic or maintenance operations to help determine the cause of the error.

As has been mentioned, as two further features of the invention, each processor may handle a plurality of stations, and the source processor 18 may generate a plurality of control blocks 49 from certain host commands. An example will illustrate both features. In one specific embodiment, data are wirtten on a disk in tracks and sectors, with each sector storing a predetermined quantity of data. In that embodiment each sector of a disk is associated with a different station. Furthermore, the data memory 16 is divided into buffers each having enough space to accommodate enough data to fill a disk sector. A host command that requires data to be written onto or read from sequential sectors on a disk track may then result in the generation of control blocks 49 which enable the disk controller 14 to begin transferring data to or from the disk at any sector and retrieving the data from or loading the data into the appropriate buffers in memory 26, eliminating any necessity of waiting until the disk rotates to the first sector before it begins the transfer.

More specifically, in a host command requiring a multiple sector transfer, for example a WRITE operation, the source processor 18 (FIG. 1) generates a plurality of control blocks each of which identifies a disk sector involved in the transfer as well as a data buffer in data memory 26 to be used in the transfer these in field 53 (FIG. 2) of the control block 49, and a route defining the stations and the operations to be performed. The source processor then transfers the control blocks to the work queue of the first station in the route for the host command, namely the host interface controller processor 12, which loads data into the buffers in data memory 26 specified in the control blocks.

After the host interface controller processor 12 loads the data into each buffer, it transfers the control block to the work queue of the station to transfer the data from memory 26 to the specified sector on the disk. Since each sector is associated with a separate station, each control block is sent to the work queue of a different station. However, to allow the same route to be used by all of the stations in this transfer, the host interface controller processor 12 would not be able to use the STATION field 40 (FIG. 2) directly to transfer the control blocks, otherwise all of the control blocks would go to the same station. Instead, the host interface controller processor 12 can determine the identity of the station to which it is to send each control block from the STATION field as well as other information in the identity of the control block such as the disk sector whose station is to receive the control block, which information may also be present in the other information portion 53 of the control block 49. In this manner, the same route may be used for sequences in which different stations are to perform the same operation, that is, to execute the same route vector, in the route, to reduce the number of routes that may be required.

As has been mentioned, when a host command results in the generation of a plurality of control blocks, a counter may also be established that indicates the number of control blocks that were generated. In the above example, one control block is generated for each sector to be transferred. When the last route vector has been executed, the station, or more specifically the processor that executes the process associated with the station, decrements the counter. When the counter has been decremented to zero, the processor may generate a response indicating successful completion of the host command.

Figure 9:
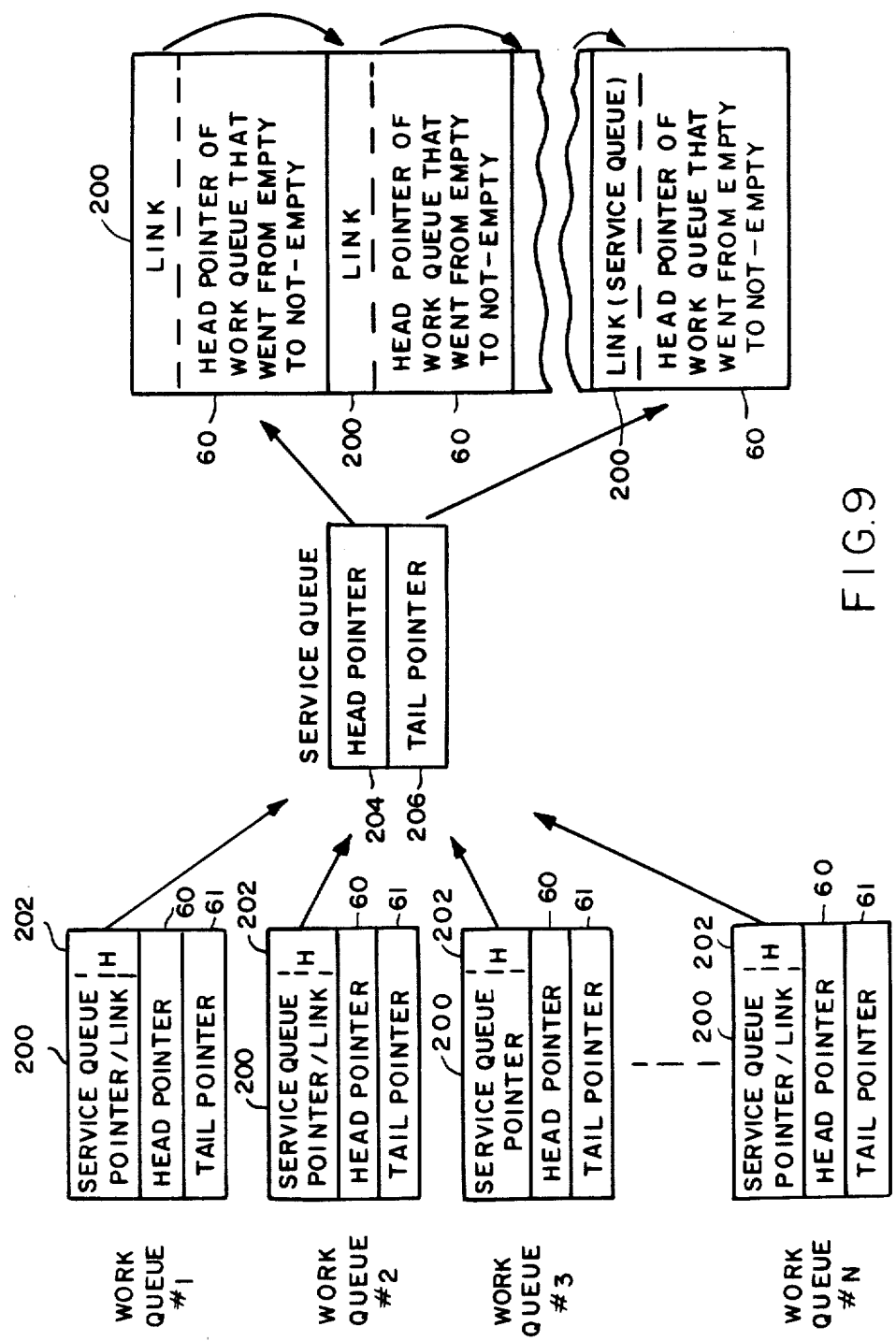
FIG. 9 is another diagram depicting a control structure that is useful in understanding a further feature of the invention.

When a processor has a plurality of stations, it may poll the stations' work queues to determine if there are control blocks to be processed. If the number of stations becomes large, however, polling the work queues may become time consuming. As an alternative to the use of polling, in one embodiment the processor may use a service queue, which is depicted in FIG. 9, which stores an identification of those work queues that were previously empty and into which a station transfers a control block. By polling the service queue, the processor can determine the work queues that have gone from being empty to being not-empty, and thus can determine the stations that require processing.

With reference to FIG. 9, in addition to a head pointer 60 and a tail pointer 61, each work queue is further defined by a service queue pointer/link 200 and an H flag 202. The processor has a service queue also defined by a head pointer 204 and tail pointer 206. When a work queue is empty, the service queue pointer points to, or contains the address in control memory 22 of, the service queue head pointer 204, and the H flag 202 is clear. When a station transfers a control block to an empty work queue, that is, when the work queue goes from being empty to being not-empty, the transferring station also loads an identification of the now not-empty work queue into the service queue.

Figure 6B:
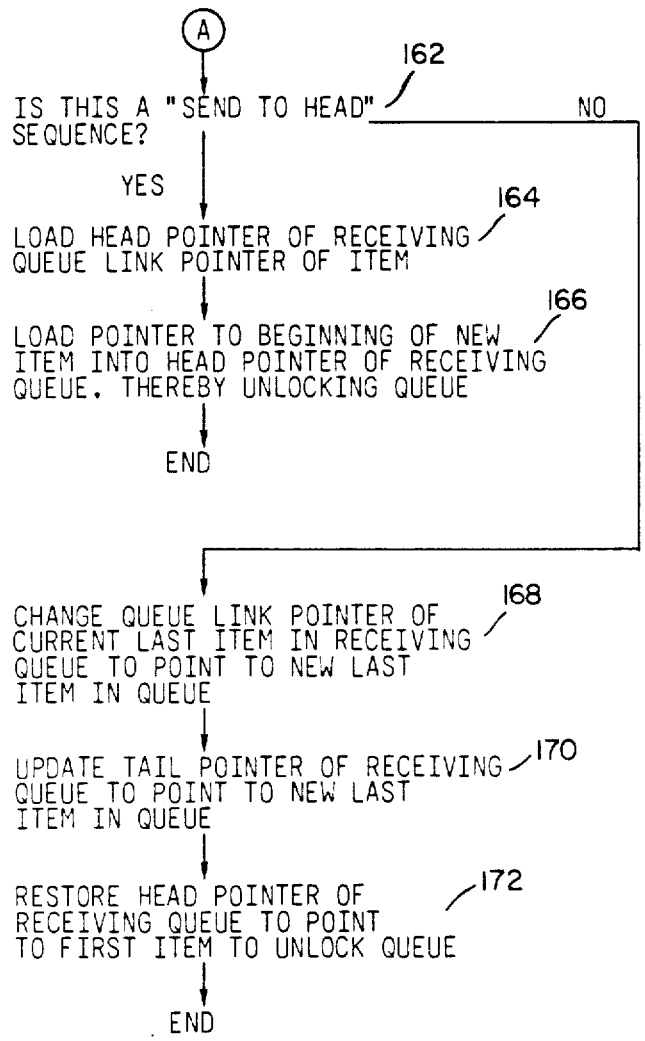

Specifically, in one specific embodiment, when the transferring station loads a control block 49 into an empty work queue, it also performs a SEND operation as depicted in FIGS. 6, 7A and 7B on the work queue, specifically altering pointer/link 200, pointers 204 and 206 and H flag 202. The transferring station first clears pointer/link 200 (step 150, FIG. 6). If the service queue was previously empty, the transferring station performs steps 154, 156, 158 and 160 to load the address of the work queue into the service queue head and tail pointers 204 and 206, and also sets the H flag 202.

If the service queue is not empty, the pointer/link 200 of each work queue in the service queue points to the next work queue in the service queue. The transferring station performs steps 162, 168, 170 and 172 to modify the pointer/link 200 of the last work queue in the service queue to point to the new last work queue, and to modify the service queue tail pointer 206 to also point to the last work queue in the service queue, and additionally sets H flag 202.

The processor can then perform the sequence depicted in FIG. 8 to determine which previously-empty work queues are not empty, and can retrieve control blocks from the not-empty work queues without having to poll them to determine whether or not they are empty.

The foregoing description is limited to a specific embodiment of this invention. It will be apparent, however, that this invention can be practiced in systems having diverse basic construction or that use different internal circuitry than is described in the specification with the attainment of some or all of the foregoing objects and advantages of this invention. Therefore, it is the object of the appended claims to cover all such variations and modifications as come within the true spirit and scope of this invention.

What is claimed as new and desired to be secured by Letters Patent of the United States is:

1. A data processing system for executing commands, each command requiring a plurality of sequentially-performed operations, comprising memory means, source processor means and a plurality of stations;
   A. said memory means for storing a route for each command, each route comprising a sequence of route vectors each including an operation specifying portion identifying an operation to be performed in partial execution of the command and a station specifying portion identifying a station for performing the identified operation;
   B. source processor means comprising
      (1) means connected to said memory means for generating, in response to a command, a control block containing a pointer identifying the first route vector in the route associated with the command; and
      (2) control block transmitting means connected to said generating means and to all of said stations for coupling the generated control block to the station to process the first route in the route vector;
   C. each station comprising:
      (1) work queue means connected to said control block transmitting means and to said other stations for receiving and storing control blocks in a queue;
      (2) means connected to said work queue means for sequentially retrieving the control blocks from said work queue means;
      (3) processing means connected to said retrieving means and to said memory means for retrieving the route vector from said memory means identified by the pointer in the retrieved control block and for performing the operation specified by the vector; and
      (4) transfer means connected to said processing means and to the k queue means of the other stations for advancing the route vector pointer in the control block to identify the next route vector in the route and for transferring the control block to the work queue means of the station that is to execute the route vector identified by the route vector pointer.

2. A data processing system as defined in claim 1 wherein each transfer means includes:
   A. means connected to said memory means for retrieving from said memory means a station specifying portion of the route vector identified by the advanced route vector pointer in the control block; and
   B. means for coupling the control block identifying the route vector to the work queue means of the identified station.

3. A data processing system as defined in claim 2 wherein one of said stations is a diagnostic station which includes diagnostic means for executing diagnostic programs and wherein each route vector further includes a diagnostic station specifying portion for identifying said diagnostic station, said transfer means further including means connected to said memory means for retrieving said diagnostic work queue identifying portion when said station is unable to perform operation specified in the route vector and for transferring the control block to the work queue of said diagnostic station.

4. A data processing system as defined in claim 2 wherein each work queue means is identified by a work queue pointer means for identifying the control blocks in the work queue, said transfer means including means for altering the work queue pointer means to couple a new control block to the work queue means.

5. A data processing system as defined in claim 4 wherein said work queue pointer means includes a tail pointer means for identifying the last control block in the work queue means, said coupling means including tail coupling means for altering the tail pointer means when coupling a new control block to the work queue means.

6. A data processing system as defined in claim 5 wherein said work queue pointer means also includes a head pointer means for identifying the first control block in the work queue means, said coupling means including head coupling means for altering the head pointer means when coupling a new control block to the work queue means.

7. A data processing system as defined in claim 6 wherein said route vector further includes flag means having a first condition for indicating that the control block is to be transferred to the head of the work queue means and a second condition for indicating that the control block is to be transferred to the tail of the work queue means, said coupling means including means for determining the condition of said flag means to enable either said head coupling means or said tail coupling means when coupling a control block to the work queue means.

8. A data processing system as defined in claim 7 wherein each control block further includes a queue link pointer means for identifying the next control block in each work queue means, the queue link pointer means of the last control block identifying the tail pointer means of the work queue means, said tail coupling means further including:
   A. means for modifying the queue link pointer means of the last control block in the recipient work queue means to identify the control block being transferred to the work queue means, and
   B. means for modifying the queue link pointer means of the control block being transferred to the work queue means to identify the tail pointer means of the work queue means.

9. A data processing system as defined in claim 7 wherein a station includes a plurality of work queue means, the station further including a service queue means having a series of entries each of which identifies those work queue means of the station which have gone from an empty condition to a non-empty condition, each entry in the series including a link identifying the next entry in the series, the service queue means comprising a head pointer means and a tail pointer means, the work queue means further including a service queue pointer means which identifies the service queue, the transfer means further comprising:
   A. condition detecting means for determining whether the receiving work queue means is empty,
   B. means connected to said condition detecting means for generating a new entry for the service queue means to identify the receiving work queue means,
   C. means for altering the link in the last entry of the service queue means to identify the new entry, and D. means for altering the tail pointer means of said service queue means to identify the new entry in the service queue means.

10. A data processing system as defined in claim 9 in which said retrieving means comprises service queue retrieval means for retrieving an entry from said service queue means comprising:
  A. means for retrieving the head pointer means of said service queue means to determine the identity of the first entry in the service queue means;
  B. entry retrieving means connected to said service queue head pointer retrieving means for using the retrieved head pointer means of said service queue means to retrieve the first entry from said service queue means,
  C. means connected to said entry retrieving means for replacing the head pointer means of the service queue means with the link from the first entry in said service queue means in response to the retrieval of an entry from said service queue means, the link constituting the new head pointer means for the service queue means.

11. A data processing system as defined in claim 6 wherein each control block includes a queue link pointer means for identifying the next control block in each work queue means, said retrieval means comprising:
  A. identification means for using the head pointer means to identify the first control block in the sequence of control blocks in the work queue means,
  B. means connected to said identification means for retrieving the identified control block from the work queue means, and
  C. means connected to said control block retrieving means for using the queue link pointer of the retrieved control block to alter the head pointer means to identify the next control block in said work queue means.

12. A data processing system as defined in claim 1 wherein said generating means generates a plurality of control blocks in response to a command, the control blocks generated by the generating means each containing a pointer identifying the first route vector in the route, with the operations identified in all of the routes being required to execute the command, said memory means further including a counter means that is associated with the command and set by said generating means to identify the number of control blocks generated by said generating means in response to the command, said control blocks associated with the command including counter identification means for identifying the location in said memory means of said counter means, said transfer means further including:
  A. means for determining that the station is executing the last route vector in the route,
  B. means connected to said determining means and to said memory means for decrementing said counter means when said processing means has completed performing the operation specified by the route vector.

13. A data processing system as defined in claim 12 wherein the last route vector in each route includes a last route vector flag which indicates that it is the last route vector, said determining means including means for testing said last route vector flag.

14. A data processing system as defined in claim 13 wherein said source processor means includes means for generating an indication that the command has been completed when said counter has been decremented to a selected value.

15. A station for connection in a data processing system that executes commands requiring a plurality of operations, the data processing system including a plurality of stations and a memory means for storing in predetermined locations a route for each command, each route comprising a plurality of route vectors each including an operation specifying portion identifying an operation to be performed by a station in partial execution of the command, said data processing means further comprising source processing means for generating, in response to a command, a control block containing a pointer identifying the first route vector in the route associated with the command and for transmitting the control block to a station, the station comprising:
  (1) work queue means connected to said source processor means and to said other stations for receiving and storing control blocks in a queue;
  (2) means connected to said work queue means for sequentially retrieving the control blocks from said work queue means;
  (3) processing means connected to said retrieving means and to said memory means for retrieving the route vector from said memory means identified by the pointer in the retrieved control block and for performing the operation specified by the route vector; and
  (4) transfer means connected to said processing means and to the work queue means of the other stations for advancing the route vector pointer in the control block to identify the next route vector and for transferring the control block to the work queue means of the station that is to execute the route vector identified by the route vector pointer.

16. A station as defined in claim 15 wherein said transfer means includes:
  A. means for connection to the memory means for retrieving the station specifying portion of the route vector identified by the advanced route vector pointer in the control block, and
  B. means for coupling the control block identifying the route vector to the work queue means of the identified station.

17. A station as defined in claim 16 wherein the work queue means is identified by a work queue pointer means for identifying the control blocks in the work queue, said transfer means including means for altering the work queue pointer means when coupling a new control block to the work queue means.

18. A station as defined in claim 17 wherein said work queue pointer means includes a tail pointer means for identifying the last control block in the work queue means, said coupling means including tail coupling means for altering the tail pointer means when coupling a new control block to the work queue means.

19. A station as defined in claim 18 wherein said work queue pointer means also includes a head pointer means for identifying the first control block in the work queue means, said coupling means including head coupling means for altering the head pointer means when coupling a new control block to the work queue means.

20. A station as defined in claim 19 wherein said route vector further includes flag means having a first condition for indicating that the control block is to be transferred to the head of the work queue means and a second condition for indicating that the control block is to be transferred to the tail of the work queue means, said coupling means including means for determining the condition of said flag means to enable either said head coupling means or said tail coupling means to couple a control block to the work queue means.

21. A station as defined in claim 20 wherein each control block further includes a queue link pointer means for identifying the next control block in each work queue means, the queue link pointer means of the last control block identifying the tail pointer means of the work queue means, all of the coupling means further including:
   A. means for modifying the queue link pointer means of the last control block in the recipient work queue means to identify the control block being transferred to the work queue means, and
   B. means for modifying the queue link pointer means of the control block being transferred to the work queue means to identify the tail pointer means of the work queue means.

22. A station as defined in claim 20 wherein a station includes a plurality of work queue means, the station further including a service queue means having a series of entries each of which identifies those work queue means which have gone from an empty condition to a non-empty condition, each entry in the series including a link to the next entry, the service queue means comprising a head pointer means and a tail pointer means, the work queue means further including a service queue pointer means which identifies the service queue, the transfer means further comprising:
   A. condition detecting means for determining whether the receiving work queue means is empty,
   B. means connected to said condition detecting means for generating a new entry for the service queue means to identify the receiving work queue means,
   C. means for altering the link in the last entry of the service queue means to identify the new entry, and
   D. means for altering the tail pointer means of said service means to identify the new entry in the service queue means.

23. A station as defined in claim 22 in which said retrieving means comprises service queue retrieval means for retrieving an entry from said service queue means comprising:
   A. means for retrieving the head pointer means of said service queue means to determine the identity of the first entry in the service queue means;
   B. entry retrieving means connected to said service queue head pointer retrieving means for using the retrieved head pointer means of said service queue means to retrieve the first entry from said service queue means,
   C. means connected to said entry retrieving means for replacing the head pointer means of the service queue means with the link from the first entry in said service queue means in response to the retrieval of an entry from said service queue means, the link constituting the new head pointer means for the service queue means.

24. A station as defined in claim 18 wherein each control block includes a queue link pointer means for identifying the next control block in each work queue means, said retrieval means comprising:
   A. identification means for using the head pointer means to identify the first control block in the sequence of control blocks in the work queue means,
   B. means connected to said identification means for retrieving the identified control block from the work queue means, and
   C. means connected to said control block retrieving means for using the queue link pointer of the retrieved control block to alter the head pointer means to identify the next control block in said work queue means.

25. A station as defined in claim 16 wherein the generating means generates a plurality of control blocks in response to a command, the control blocks generated by the generating means each containing a pointer identifying the first route vector in the route, with the operations identified in all of the routes being required to execute the command, the memory means further including a counter means that is associated with the command and set by the generating means to identify the number of control blocks generated by the generating means in response to the command, the control blocks associated with the command including counter identification means for identifying the location in the memory means of said counter means, said transfer means further including:
   A. means for determining that the station is executing the last route vector in the route,
   B. means connected to said determining means and to said memory means for decrementing said counter means when said processing means has completed performing the operation specified by the route vector.

26. A station as defined in claim 25 wherein the last route vector in each route includes a last route vector flag which indicates that it is the last route vector, said determining means including means for testing said last route vector flag.

27. A method of controlling a multiprocessor system which executes commands, one of the processors comprising a source processor and the other processors comprising execution processors, the commands requiring a plurality of operations each performed by a selected one of the execution processors in the multiprocessor system, each command being associated with a route that comprises a series of route vectors each identifying an operation to be performed and the execution processor to perform the operation, each execution processor including a work queue for storing control blocks, the method comprising the steps of:
   a. the source processor;
      (i) generating a control block in response to the receipt of a command, the control block including a route vector pointer identifying the first route vector in a route, and
      (ii) coupling the control block to the work queue of the execution processor identified by the first route vector in the identified route,
   B. each execution processor:
      (i) serially retrieving control blocks from its associated work queue and performing the operation required by the route vector identified by the control block,
      (ii) advancing the route vector pointer in the control block to identify the next route vector in the route, and
      (iii) coupling the control block to the work queue of the execution processor identified by the route vector identified by the advanced route vector pointer.

28. A method as defined in claim 27 in which the transfer step includes the steps of:
- A. retrieving the identification of the execution processor to process the route vector identified by the advanced route vector pointer from said memory means, and
- B. coupling the control block identifying the route to the work queue of the identified execution processor.

29. A method as defined in claim 28, each work queue being identified by a work queue pointer means for identifying the control blocks in the work queue, the transfer step including the step of altering the work queue pointer means when coupling a new control block to the work queue.

30. A method as defined in claim 29, said work queue pointer means including a tail pointer means for identifying the last control block in the work queue, the transfer step including the step of altering the tail pointer means when coupling a new control block to the work queue.

31. A method as defined in claim 29, said work queue pointer means includes a head pointer means for identifying the first control block in the work queue, the transfer step including the step of altering the head pointer means when coupling a new control block to the work queue.

32. A method as defined in claim 31, said route vector further including flag means having a first condition for indicating that the control block is to be transferred to the head of the work queue and a second condition for indicating that the control block is to be transferred to the tail of the work queue, the transfer step including the step of testing said flag means prior to coupling the control block to the work queue.

33. A method as defined in claim 32, each control block further including a queue link pointer means for identifying the next control block in each work queue, the queue link pointer means of the last control block identifying the tail pointer means of the work queue, the transfer step including the steps of:
- A. modifying the queue link pointer means of the last control block in the recipient work queue to identify the control block being transferred to the work queue, and
- B. modifying the queue link pointer means of the control block being transferred to the work queue to identify the tail pointer means of the work queue.

34. A method as defined in claim 32, an execution processor including a plurality of work queues and a service queue having a series of entries each of which identifies those work queues which have gone from an empty condition to a non-empty condition, each entry in the series including a link to the next entry, the service queue comprising a head pointer means and a tail pointer means, the work queue further including a service queue pointer means which identifies the service queue, the transfer step further comprising the steps of:
- A. determining whether the receiving work queue is empty,
- B. generating a new entry for the service queue to identify the receiving work queue,
- C. altering the link in the last entry of the service queue to identify the new entry, and
- D. altering the tail pointer means of said service queue to identify the new entry in the service queue.

35. A data processing system as defined in claim 34, the retrieval step comprising the steps of:
- A. retrieving the head pointer means of said service queue to determine the identity of the first entry in the service queue;
- B. using the head pointer means of said service queue to retrieve the first entry from said service queue,
- C. replacing the head pointer means of the service queue with the link from the first entry in said service queue, the link constituting the new head pointer means for the service queue.

36. A method as defined in claim 33, each control block including a queue link pointer means for identifying the next control block in each work queue, the retrieval step comprising the steps of:
- A. using the head pointer means to identify the first control block in the sequence of control blocks in the work queue,
- B. retrieving the first control block from the work queue, and
- C. using the queue link pointer of the retrieved control block to alter the head pointer means to identify the next control block in said work queue.

37. A method as defined in claim 27, said source processor generating a plurality of control blocks in response to a command each containing a pointer identifying the first route vector in a route, the operations identified in all of the routes being required to execute the command, the source processor further establishing a counter to identify the number of control blocks generated by said generating means in response to the command, the control blocks associated with the command including counter identification means for identifying the counter, the transfer step including the steps of:
- A. determining that the execution processor is executing the last route vector in the route,
- B. decrementing said counter means when said processing means has completed performing the operation specified by the route vector.

38. A method as defined in claim 37 the last route vector in each route including a last route vector flag which indicates that it is the last route vector, the determining step including the step of testing the last route vector flag.

39. A method as defined in claim 38 further including the step of the source processor generating an indication that the command has been completed when said counter has decremented to a selected value.

40. A peripheral controller for connection to a host data processing system for controlling transfers of data between external units, including the host system and a peripheral unit, in response to commands from the host system, said peripheral controller comprising a plurality of execution processor means each for connection to an external unit, said peripheral controller further including:
- A. memory means including control storage means for storing a route for each command, each route including a sequence of route vectors each including an operation specifying portion identifying an operation to be performed in execution of the command and an execution processor specifying portion identifying and execution processor means for performing the identified operation,
- B. source processor means comprising:
  - (i) means connected to said control storage means for generating, in response to a command from the host system, a control block containing a pointer identifying the first route vector in the route associated with the command and the execution processor means for performing the operation; and (ii) control block transmitting means connected to said generating means and to all of said execution processor means for coupling the generated control block to the execution processor means to process the first route in the route vector;

C. each execution processor means comprising:
  (i) work queue means connected to said control block transmitting means and to said other execution processor means for receiving and storing control blocks,
  (ii) means connected to said work queue means for sequentially retrieving the control blocks from its work queue means,
  (iii) processing means connected to said retrieving means and to said memory means for retrieving the route vector from said memory means identified by the route vector pointer in the retrieved control block and for performing the operation specified by the identified route vector, and
  (iv) transfer means connected to said processing means and to the work queue means of the other execution processors for advancing the route vector pointer in the control block to identify the next route vector in the route and for transferring the control block to the work queue means of the execution processor means that is to execute the route vector identified by the route vector pointer.

41. A peripheral controller as defined in claim 40 wherein said memory means further includes data storage means, each processing means including means for coupling data between said data storage means and the external unit to which it is connected.

42. A peripheral controller as defined in claim 41 wherein one of the external units is divided into a plurality of sectors each for storing a predetermined amount of data, said data storage means being divided into a plurality of segments each for storing a like predetermined amount of data, said source processor means generating a plurality of control blocks each for enabling the execution processor associated with the external unit to transfer data between one of the segments and one of the sectors.

43. A peripheral controller as defined in claim 42 wherein said execution processor associated with said one of said external units includes a plurality of work queue means, retrieving means, processing means, and transfer means each associated with one of said sectors.

44. A peripheral controller as defined in claim 43 wherein said source processor means establishes a counter identifying the number of control blocks associated with a command and identifies the counter in the control blocks associated with the command, each transfer means of said execution processor associated with said one of said external units further including means for decrementing the counter following the execution of the last route vector in the route.

45. A peripheral controller as defined in claim 44 wherein said source processor further includes means for generating a message for transmission to the host system indicating the decrement of the counter to indicate the completion of execution of the last route associated with execution of the command.

46. An execution processor for connection in a peripheral controller that controls transfers of data between external units and host system and a peripheral unit in response to commands from the host system, the peripheral controller including a plurality of execution processors and a memory for storing a route for each command comprising a plurality of route vectors each including an operation specifying portion identifying an operation to be performed in partial execution of the command and an execution processor to perform the operation and a source processor means for generating a control block in response to each command containing a pointer identifying the first route vector in the route associated with the command and for coupling the control block to an execution processor, the execution processor being for connection to an external unit and comprising:
  (i) work queue means connected to said source processor means and to said other execution processors for receiving and storing control blocks,
  (ii) means connected to said work queue means for sequentially retrieving the control blocks from said work queue means,
  (iii) processing means connected to said retrieving means and to said memory means for retrieving the route vector from said memory means identified by the route vector pointer in the retrieved control block and for performing the operation specified by the identified route vector, and
  (iv) transfer means connected to said processing means and to the other execution processors for advancing the route vector pointer in the control block to identify the next route vector in the route and for transferring the control block to the execution processor that is to execute the route vector identified by the route vector pointer.

47. An execution processor as defined in claim 46, said memory means further storing data for transfer with said external units, said processing means including means for transferring data between the memory and the external unit.

48. A peripheral controller as defined in claim 47, the external unit being divided into a plurality of sectors each for storing a predetermined amount of data, the memory being divided into a plurality of segments each for storing a like predetermined amount of data, and the source processor means generating a plurality of control blocks each for enabling the execution processor to transfer data between one of the segments and one of the sectors, the execution processor including a plurality of work queue means, retrieving means, processing means, and transfer means each associated with one of said sectors.

49. A peripheral controller as defined in claim 48, the source processor establishing a counter identifying the number of control blocks associated with a command and identifying the counter in the control blocks associated with the command, all of said transfer means further including means for decrementing the counter following the execution of the last route vector in the route.

* * * * *